United States Patent [19]

Ferrando

[11] Patent Number: 4,574,096
[45] Date of Patent: Mar. 4, 1986

[54] SUSPENSION METHOD OF IMPREGNATING ACTIVE MATERIAL INTO COMPOSITE NICKEL PLAQUE

[75] Inventor: William Ferrando, Arlington, Va.

[73] Assignee: The United States of America as represented by the Secretary of the Navy, Washington, D.C.

[21] Appl. No.: 740,115

[22] Filed: May 29, 1985

[51] Int. Cl.⁴ .................. B05D 5/12; H01M 4/04
[52] U.S. Cl. .................. 427/126.6; 427/126.3; 427/247; 427/295
[58] Field of Search .............. 427/126.6, 247, 295, 427/126.3

[56] References Cited

U.S. PATENT DOCUMENTS

| | | | |
|---|---|---|---|
| 3,533,842 | 10/1970 | Hart | 427/126.6 |
| 3,540,931 | 11/1970 | Loukomsky | 427/126.6 |
| 4,189,510 | 2/1980 | McIntyre | 427/247 |
| 4,215,190 | 7/1980 | Ferrando | 429/235 |

Primary Examiner—Richard Bueker
Attorney, Agent, or Firm—Robert F. Beers; Kenneth E. Walden; Roger D. Johnson

[57] ABSTRACT

A process for impregnating nickel or cadmium active material into a sintered nickel coated graphite fiber composite plaque electrode in which a suspension of 1–20 micron particles of active material in ethylene glycol in a 1:1 to 1:4 weight ratio of glycol to particles is gently worked into the plaque and the ethylene glycol is then evaporated off leaving the particles of active material distributed throughout the plaque. This procedure is repeated until the desired level of loading is achieved.

15 Claims, 4 Drawing Figures

SUSPENSION METHOD OF IMPREGNATING ACTIVE MATERIAL INTO COMPOSITE NICKEL PLAQUE

BACKGROUND OF THE INVENTION

This invention relates to electrochemical cells and more particularly to electrodes for electrochemical cells.

In the nickel-cadmium alkaline cell, porous nickel plates are used to construct both the positive and negative electrodes. The active material for the positive and negative electrodes is contained within the nickel plates. The positive plate contains nickel hydroxide while the negative plate contains cadmium hydroxide.

U.S. Pat. No. 4,215,190 entitled "Light Weight Battery Electrode," issued to William A. Ferrando and Raymond A. Sutula on July 29, 1980, discloses an electrode grid comprising a sintered mat or felt of graphite fibers which are coated with a mixture of nickel and phosphorous. The electrode grid is strong, lightweight, and has good electrical performance. However, the nickel coated graphite fibers of the grid can be damaged when subject to pressures such as occur in convention paste loading procedures of active material. Moreover, when an active material paste is applied to the sintered plaque, severe blockage of the surface pores results. The great bulk of the paste remains outside of the plaque as surface layer. As a result, a method such as (1) a vacuum impregnation (polarization) process, (2) a thermal decomposition process, or (3) an electrochemical deposition process is used. These methods all have common features. In each, the impregnating solution is an aqueous nickel salt solution, usually nickel nitrate. Depending upon the method, the nitrate solution is electrolytically deposited within the pores and/or converted to the active nickel hydroxide form by the same means. The entire process requires tanks, counterelectrodes, power supplies and other equipment. It requires thorough rinsing of the electrode at various stages. The processes are suited to batch rather than continuous processing. The time required for all these operations is considerable. The total processing cost is correspondingly high.

SUMMARY OF THE INVENTION

Accordingly, an object of this invention is to provide a new method of impregnating sintered nickel coated graphite fiber plaques with a nickel or cadmium active material to form a nickel or cadmium electrode.

Another object of this invention is to provide a method of introducing a nickel or cadmium active material directly into a sinter nickel coated graphite fiber plaque with no electrolytic conversion being required.

A further object of this invention is to provide a method of impregnating a nickel or cadmium active material into a sintered nickel coated graphite fiber plaque which does not require rinsing steps.

Yet another object of this invention is to provide a method of impregnating a nickel or cadmium active material into a sintered nickel coated graphite fiber plaque which does not require the use of expensive equipment such as impregnation tanks, power supplies, and temperature and pH controls.

A still further object of this invention is to provide a method of impregnating nickel or cadmium active material into a sintered nickel coated graphite fiber plaque which is quick and simple and which can be used in a continuous process.

Finally, another object of this invention is to provide a method of impregnating nickel or cadmium active material into sintered nickel coated graphite fiber plaques at a substantial savings over prior art processes.

These and other objects of this invention are accomplished by providing:

A process for impregnating a sintered nickel coated graphite fiber plaque with active material to form an electrode comprising:
 (1) forming a suspension of particles of the active material in ethylene glycol wherein the particles of active material are 20 microns or less in size and wherein the weight ratio of ethylene glycol to active material is from 1:1 to 1:4;
 (2) gently working the suspension into the sintered plaque by
  (a) applying the suspension onto the top surface of the plaque,
  (b) gently pushing the suspension into the plaque while allowing the pull of gravity on the suspension to do much of the work; and
  (c) removing the excess suspension from the top surface of the plaque;
 (3) evaporating off the ethylene glycol to leave the particles of active material distributed throughout the sintered plaque; and
 (4) repeating steps (2) through (3) until the desired amount of active material has been deposited in the sintered plaque.

For a nickel electrode the active material can be nickel hydroxide, nickel oxide, or mixtures thereof usually with cobalt hydroxide or cobalt oxide as an additive.

For cadmium electrodes the active material can be cadmium hydroxide, cadmium oxide, or mixtures thereof.

BRIEF DESCRIPTION OF THE DRAWINGS

A more complete understanding of the invention and many of its attendant advantages thereof will be readily appreciated as the same becomes better understood by reference to the following detailed description when considered in connection with the accompanying drawings, wherein:

FIGS. 1 through 4 are discussed in more detail in the example.

DETAILED DESCRIPTION OF THE PREFERRED EMBODIMENT

Figure 1:
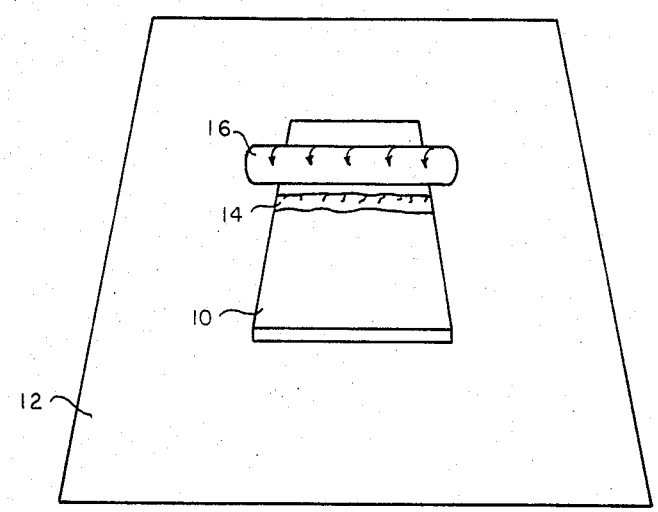
FIG. 1 is a schematic presentation of the equipment used in impregnating the nickel hydroxide active material into the electrodes in the example.

The process of this invention is designed to impregnate sintered plaques or mats of nickel coated graphite fibers with active material to produce an electrode. U.S. patent application Ser. No. 4,215,190 entitled "Light Weight Battery Electrode", issued to William A. Ferrando and Raymond A. Sutula on July 29, 1980, herein incorporated by reference, discloses examples of these sintered plaques or mats and methods of preparing them. The graphite fiber used have a density of at least 1.8 g/cm$^3$, lengths of from 1 to 3 inches, and diameters of less than 10 microns. The nickel coating is actually a coating of from 85 to less than 100 weight percent nickel with remainder being phosphorous. However, the coating functions electrochemically as a pure nickel coating would. These plaques typically have a highly interconnected pore structure of average effective diameter 50-60 microns ($10^{-6}$ meter). Percent void volumes of 80-90% are easily achievable in those plaques.

The process of this invention has been used to form both nickel and cadmium electrodes by loading the appropriate active materials into sintered nickel coated graphite fiber plaques. For nickel electrodes the active material is nickel hydroxide, nickel oxide, or mixtures thereof, with nickel hydroxide being preferred. For cadmium electrodes the active material is cadmium hydroxide, cadmium oxide, or mixtures thereof, with cadmium hydroxide being preferred. A cobalt compound is usually added to the nickel active material in a nickel electrodes. The cobalt additive is cobalt hydroxide, cobalt oxide, or mixtures thereof, with cobalt hydroxide being preferred. The cobalt compound comprises from more than zero to about 10, and preferably from 5 to 7 weight percent of the nickel active material-cobalt additive mixture.

In the present process, a suspension of fine particles of the active material (and cobalt additive if used) is gently pushed into the plaque by gently rubbing it in or by using a soft, light roller to press it in. The usual procedure is to place the sintered nickel composite plaque to the smooth, flat surface which is essentially parallel to the ground. The suspension is applied to the top surface of the plaque and the pull of gravity on the suspension is allowed to do much of the work of drawing the suspension into the plaque during this pushing step. Excess suspension is removed from the surface of the plaque to prevent a build up of active material which would hamper further impregnations. Note that the solid particles tend to settle out of the ethylene glycol with time; therefore, the suspension is preferably agitated (e.g., stirred) just before it is applied to the plaque.

The plaques have a continuous porosity of about 50-60 microns. The fine particles must be significantly less in size than 50 microns, preferably less than 20 microns, and more preferably less than 5 microns in size.

A critical feature of this process is the use of ethylene glycol to suspend the particles of active material. Many common liquids such as water or methanol are not viscous enough to support the particles of active material in a suspension. Other liquids were found to be too viscous to be used. Glycerol was found to be marginally useful for the process of this invention. However, relatively small amounts of active material raise the viscosity of the suspension to the upper limits useful for this process. Moreover, the boiling point of glycerol is 290° C. at 760 mm. As a practical matter, this means that a combination of heat and vacuum is necessary to evaporate the glycerol from the perform at a temperature low enough not to harm the nickel or cadmium active materials.

Ethylene glycol proves to be the preferred liquid for forming the suspension of active material particles. First, it has a boiling point of 197° C. at 760 mm. As a result, the ethylene glycol can be removed from the preform by heating at a temperature which will not damage the nickel or cadmium active material without the use of vacuum. Moreover, substantial amounts of the active material particles can be suspended in ethylene glycol without raising the viscosity beyond the useful limits (of from 20 to 50,000 centipoise at 20° C.) for this process.

The weight ratio of ethylene glycol to (1) nickel active material plus any cobalt additive or (2) to cadmium active material in the suspensions is from 1:1 to 1:4, and preferably from 1:2 to 1:3. As the amount of solid particles is increased above the 1:4 limit, the suspension becomes too viscous to be properly impregnated into the sintered nickel coated graphite fiber composite plaque. If the amount of solid particles is decreased below the 1:1 limit, the process becomes inefficient.

After the active material/ethylene glycol suspension has infiltrated the sintered nickel coated graphite fiber composite plaque, the ethylene glycol is evaporated off leaving the nickel or cadmium active material behind in the pores of the plaque. The ethylene glycol evaporation is preferably done at a temperature of from 50° to 150° C. and more preferably at 150° to 190° C., all at normal ambient atmospheric pressure. Higher temperatures may cause damage to the nickel or cadmium active material and at lower temperatures the evaporation rate will be too slow. Although vacuum may be used in the evaportion step, it is not necessary and will increase the cost of the process.

The impregnation and evaporation steps may be repeated until the desired loading level is achieved.

The invention having been generally described, the following example is given to illustrate the practice and advantages of the present invention. It is to be understood that the example is given by way of illustration and is not meant to limit the specification or the claims to flow in any manner.

EXAMPLE

The following procedure was used to make each of the four test electrodes.

The nickel composite plaque pore size of approximately 50 microns and open structure allowed the Ni(OH$_2$ active material to be introduced directly. To accomplish this, commercial battery grade Ni(OH)$_2$ powder (SAB NIFE, Inc., Lincoln, RI 02865) was finely ground (approximately 1-20 microns) in a ball mill. The powder was thoroughly mixed into ethylene glycol to the consistency of heavy cream (a weight ratio of ethylene glycol to Ni(OH)$_2$ of approximately 1:3). The glycol served the dual purpose of holding the particles in suspension and providing lubrication as they were pressed into the plaque. Referring to FIG. 1, the sintered nickel coated graphite fiber composite plaque 10 was placed on a smooth surface 12 and a quantity of the Ni(OH)$_2$/ethylene glycol suspension 14 was applied to the top surface of the composite plaque 10. A soft roller 16 was used to gently rub or press the suspension 14 into the composite plaque 10. The infiltrated plaque was then heated (150°-190° C.) to evaporate the glycol (b.p. 198° C.). The process was repeated to increase the loading. Since pure active Ni(OH)$_2$ was used with no introduced impurity ions, the electrode, after surface cleaning, may be assembled directly into the cell.

Table 1 lists the important parameters of 4 electrodes which were prepared and tested.

TABLE 1
SUSPENSION IMPREGNATED TEST ELECTRODE PARAMETERS

| Electrode No. | Plaque Type | Thickness (mm) | Porosity % | Theor. Loading* Ah/kg | Theor. Loading* Ah/cm³ | Cobalt Additive |
|---|---|---|---|---|---|---|
| 75 | A | 1.0 | 82 | 183 | 0.319 | Surface Treatment |
| 44 | B | 1.0 | 83 | 183 | 0.329 | 5% Dispersed in Active Material |
| 74 | B | 2.5 | 73 | 208 | 0.337 | Surface Treatment |
| 17 | A | 1.0 | 80 | 152 | 0.209 | 5% Dispersed in Active Material |

A = Electroplated Chopped Graphite Fiber Plaque
B = Electroless Ni Plated Graphite Mat Fiber Plaque
*Excluding Tab Weight In electrodes 17 and 44, 5 percent by weight of fine (approximately 1–20 microns) $Co(OH)_2$ powder was mixed in with the $Ni(OH)_2$. In electrodes 74 and 75, 100 percent $Ni(OH)_2$ powder was used. The $Ni(OH)_2$/sintered nickel coated graphite fiber composite plaque electrodes 74 and 75 were soaked in 0.5M cobalt acetate-water solution then in 0.25M sodium carbonate solution. Finally, each was rinsed and dried.

Figure 2:
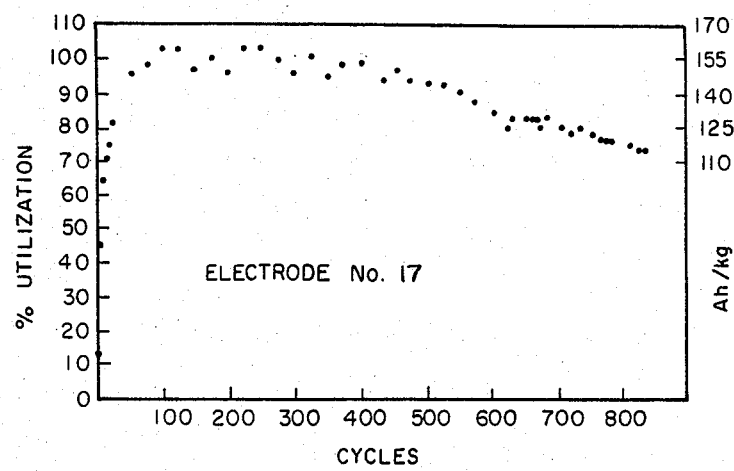
FIGS. 2, 3, and 4 are graphs presenting the results of cycle testing of the 4 electrodes prepared in the example.
Figure 3:
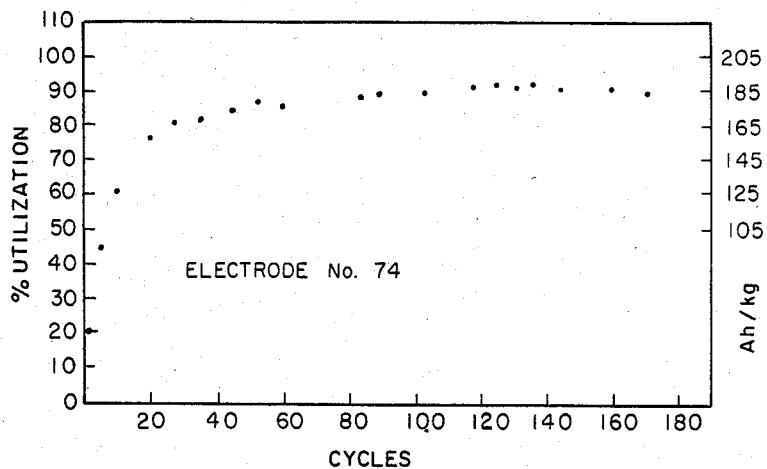
Figure 4:
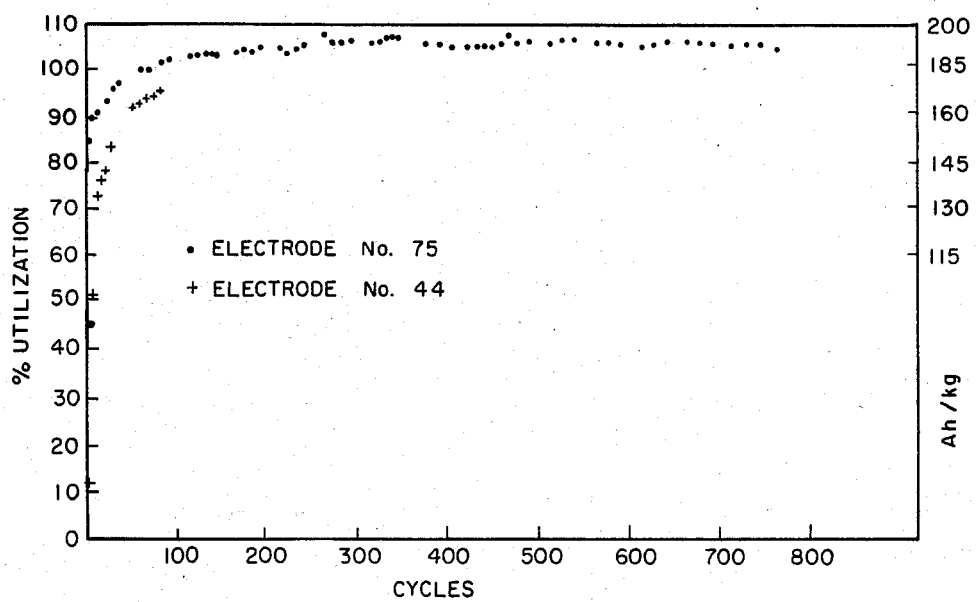

FIG. 2 (electrode 17), FIG. 3 (electrode 74) and FIG. 4 (electrode 75: solid circles; electrode 44: crosses) show typical cycle test results on small suspension impregnated nickel cathodes. The constant current cycling regime included 120% charge at the C rate, 10 minute rest, discharge at C/2 to 0.75 V (95% DOD). The capacity (C) was determined in each case by the plaque weight gain after impregnation. Commercial cadmium negatives were used with unlithiated 31% KOH electrolyte in flooded conditions. The data show utilizations of 90–105% and working (gravimetric) energy densities of 150–190 Ah/kg over much of their (600 cycle) lifetimes under the applied conditions. Electrodes (both anode and cathode) operating at a 190 Ah/kg energy density would enable construction of a complete Ni-Cd cell with energy density approaching 65 Wh/kg (30 Wh/lb.).

Particular attention is called to FIG. 4. This compares the utilization of a gridless electrode 44 with that of electrode 75, each loaded to equal theoretical gravimetric energy density (see Table 1). Results (through 80 cycles) indicate the possibility of fabricating efficient composite nickel electrodes without current collector gride.

Cycling test results indicate the feasibility of impregnating sintered nickel composite plaques with $Ni(OH)_2$ powder from a particulate suspension by a simple infiltration process. This method is directly applicable to composite cadmium electrodes. A number of these have been fabricated with good results. In principle, the method could be used to produce other electrodes such as iron or zinc. With suitable modification, this technique also might be employed to fabricate cathodes for proposed lithium rechargeable systems. In any case the proposed suspension method appears to be a simple, low cost alternative impregnation procedure for sintered composite electrodes.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent in the United States is:

1. A process for impregnating a sintered nickel coated graphite fiber plaque with a nickel active material to form a nickel electrode comprising:
   (1) forming a suspension of particles of a nickel active material selected from the group consisting of nickel hydroxide, nickel oxide, and mixtures thereof in ethylene glycol wherein the particles are 20 microns or less in size and wherein the weight ratio of ethylene glycol to nickel active material is from 1:1 to 1:4,
   (2) gently working the suspension of nickel active material in ethylene glycol into the sintered nickel coated graphite fiber plaque by
      (a) applying the suspension onto the top surface of the plaque,
      (b) gently pushing the suspension into the plaque while allowing the pull of gravity on the suspension to do much of the work; and
      (c) removing any excess of suspension from the surface of the plaque;
   (3) evaporating the ethylene glycol from the plaque to leave the particles of nickel active material distributed throughout the plaque; and
   (4) repeating steps (2) through (3) until the desired amount of nickel active material has been deposited in the plaque.

2. A process according to claim 1 wherein the nickel active material is nickel hydroxide.

3. A process according to claim 1 wherein from more than zero to about 10 weight percent of a cobalt additive material selected from the group consisting of cobalt hydroxide, cobalt oxide, and mixtures thereof is included with the nickel active material.

4. A process according to claim 3 wherein from about 5 to about 7 weight percent of the cobalt additive material is included with the nickel active material.

5. A process according to claim 1 wherein the cobalt active material is cobalt hydroxide.

6. A process according to claim 1 wherein the weight ratio of ethylene glycol to nickel active material is from 1:2 to 1:3.

7. A process according to claim 1 wherein the particles of nickel active material are less than 5 microns in size.

8. A process according to claim 1 wherein the evaporation in step (3) is performed at a temperature of from 50° to 150° C.

9. A process according to claim 8 wherein the evaporation in step (3) is performed at a temperature of from 150° to 190° C.

10. A process for impregnating a sintered nickel coated graphite fiber plaque with a cadmium active material to form a cadmium electrode comprising:
   (1) forming a suspension of particles of a cadmium active material selected from the group consisting of cadmium hydroxide, cadmium oxide, and mixtures thereof in ethylene glycol wherein the particles are 20 microns or less in size and wherein the weight ratio of ethylene glycol to cadmium active material is from 1:1 to 1:4;

(2) gently working the suspension of cadmium active material in ethylene glycol into the sintered nickel coated graphite fiber plaque by (a) applying the suspension onto the top surface of the plaque, (b) gently pushing the suspension into the plaque while allowing the pull of gravity on the suspension to do much of the work; and (c) removing any excess of suspension from the surface of the plaque;

(3) evaporating the ethylene glycol from the plaque to leave the particles of the cadmium active material distributed throughout the plaque; and (4) repeating steps (2) through (3) until the desired amount of nickel activated material has been deposited in the plaque.

11. A process according to claim 10 wherein the cadmium active material is cadmium hydroxide.

12. A process according to claim 10 wherein the weight ratio of ethylene glycol to cadmium active material is from 1:2 to 1:3.

13. A process according to claim 10 wherein the particles of cadmium active material are less than 5 microns in size.

14. A process according to claim 10 wherein the evaporation in step (3) is performed at a temperature of from 50° to 150° C.

15. A process according to claim 14 wherein the evaporation in step (3) is performed at a temperature of from 150° to 190° C.

* * * * *